Jan. 15, 1957 N. J. MOSELY 2,777,464

FLOW CONTROL DEVICES

Filed March 7, 1951

INVENTOR.

Neal J Mosely

United States Patent Office 2,777,464
Patented Jan. 15, 1957

2,777,464
FLOW CONTROL DEVICES

Neal J. Mosely, Mount Lebanon, Pa., assignor to Detroit Controls Corporation, a corporation of Michigan Application March 7, 1951, Serial No. 214,386

3 Claims. (Cl. 137—516.13)

This invention relates to new and useful improvements in flow control devices and more particularly to an elastically deformable flow control member operable to maintain constant flow in a conduit irrespective of variations in line pressure. In the art of thermostatically operated mixing valves and more particularly in the automatic washing machine art there has developed a need for an efficient and inexpensive means for maintaining constant flow irrespective of pressure changes to provide a constant response by the thermostatically operated mixing valves used therein. Accordingly, it is one object of this invention to provide a new and improved flow control device or restrictor which is operable to maintain constant flow through a conduit irrespective of pressure variations.

Another object is to provide a new and improved elastically deformable flow restrictor which is simply constructed and inexpensive to manufacture.

Other objects will become apparent from time to time throughout the specification and claims as hereinafter related.

This invention comprises the new and improved construction as shown and set forth herein which will be described more fully hereinafter and the novelty of which will be particularly pointed out and distinctly claimed.

Figure 1:
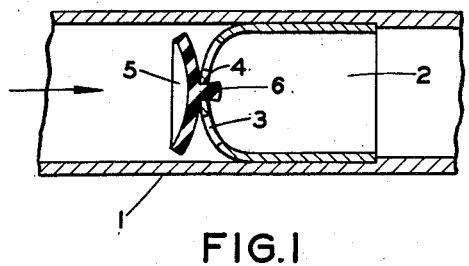
Figure 2:
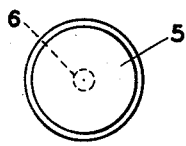
Figure 3:
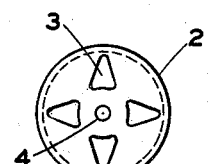
Figure 4:
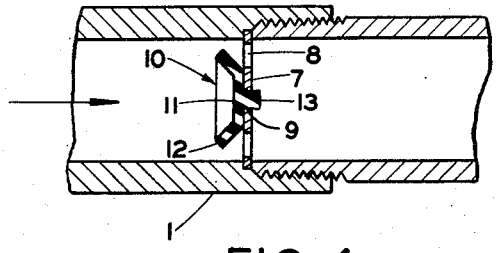
Figure 5:
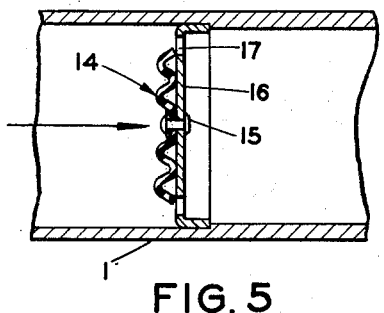
Figure 7:
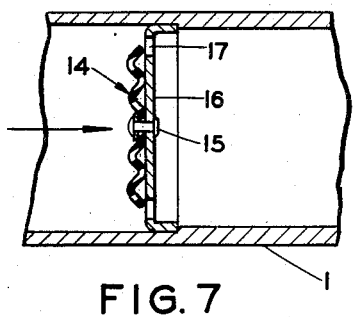
Figure 6:
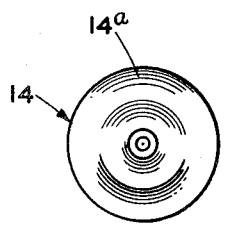
Figure 8:
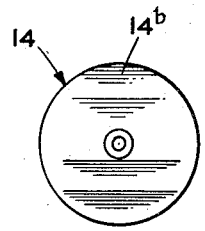

In the accompanying drawings to be taken as part of this specification there are clearly and fully illustrated a number of embodiments of this invention in which drawings:

Figure 1 is a central sectional view of one form of flow restrictor and the conduit in which it is positioned, Fig. 2 is a plan view of the flow restrictor shown in Fig. 1, Fig. 3 is an end view of the supporting member for the flow restrictor shown in Fig. 1 with the restrictor member removed therefrom, Fig. 4 is a sectional view of a modification of the restrictor shown in Fig. 1 and the conduit in which it is positioned, Fig. 5 is a sectional view of another form of flow restrictor having circular corrugations, Fig. 6 is a plan view of the restrictor shown in Fig. 5, Fig. 7 is a sectional view of a flow restrictor similar to the one shown in Fig. 5 but having parallel corrugations, Fig. 8 is a plan view of the restrictor shown in Fig 7.

Referring to the drawings by characters of reference and more particularly to Figs. 1 to 3 there is shown a conduit 1 in which there is positioned a cup-shaped supporting member 2 having a plurality of flow passages or apertures 3 and a central aperture 4. There is provided a flow restrictor member 5 preferably of rubber or synthetic rubber or other resiliently elastic deformable material having a centrally located teat 6 inserted through the aperture 4 to secure the restrictor 5 to the cup-shaped member 2. Upon flow of water or other fluid through the conduit 1 there is normally no deflection or deformation of the flow responsive member 5. However, upon excessive pressure variations or pressure changes the member 5 will be deflected to partially close the flow apertures 3 and thus compensate for increase in line pressure. The apertures 3 may be tapered, as shown in Fig. 3, so that as the member 5 is deflected to cover them the amount of reduction of flow will correspond accurately to the amount of increased flow caused by increased pressure. The exact shape of the apertures 3 can be calculated from known equations governing fluid flow or could be experimentally determined. In Fig. 4 the conduit 1 has a flat plate 7 secured therein having peripheral flow apertures 8 and a central aperture 9. There is provided a rubber or synthetic rubber flow restrictor 10 having a flat central portion 11 and an upturned peripheral portion 12 deformable by pressure to partially close the flow apertures 8 to compensate for increased pressure. The restrictor member 10 is held on the plate 7 by a teat 13 extending through the aperture 9.

In Figs. 5 and 6 there is shown a flow restrictor 14 of corrugated construction and having circular corrugations 14ª thereon. The restrictor 14 is secured as by a rivet 15 to a cup-shaped supporting member 16 having peripheral flow apertures 17. In this arrangement increased pressure tends to flatten the restrictor 14 and expand the periphery thereof to partially close the flow apertures 17 and compensate for increased pressure thereby maintaining constant flow through the conduit. In Figs. 7 and 8 the arrangement is substantially identical to that shown in Figs. 5 and 6 except that the corrugations 14ᵇ of the flow restrictor 14 are parallel rather than circular. Since the parts are otherwise identical the same reference numerals are used in Figs. 7 and 8 as in Figs. 5 and 6.

In the type of restrictor shown in Fig. 6 the member 14 upon compression will undergo a diametrical expansion in all directions while in the form shown in Fig. 8 the expansion will be only along a diameter normal to the parallel corrugations. The type shown in Fig. 6 has the advantage of being easily molded while the type shown in Fig. 8 could be die cut from extruded corrugated strip.

Having thus described the invention what is claimed and desired to be secured by Letters Patent of the United States is:

1. In a flow controlling device for maintaining constant flow of a liquid independently of pressure variations, a conduit, a circular supporting member in said conduit having a plurality of flow apertures spaced around the periphery thereof, a resiliently elastic deformable member secured to said supporting member substantially centrally of said apertures, said elastic member being of corrugated construction and having a peripheral edge having a projected diameter less than that of said supporting member, and said elastic member being operable upon increase of fluid pressure thereagainst to be deformed toward a flattened condition against said supporting member and to expand diametrically to cause said peripheral edge to restrict said flow apertures.

2. A flow controlling device as defined in claim 1 wherein the elastic member has circular corrugations which provide for diametrical expansion in all directions.

3. A flow controlling device as defined in claim 1 wherein the elastic member has parallel straight line corrugations which provide for diametrical expansion only along the diameter normal to said corrugations.

References Cited in the file of this patent

UNITED STATES PATENTS

| | | |
|---|---|---|
| 699,273 | Wolski | May 6, 1902 |
| 1,718,350 | Greenwald | June 25, 1929 |
| 1,767,201 | Boynton | June 24, 1930 |
| 1,897,155 | Vaughn | Feb. 14, 1933 |
| 2,106,775 | Trask | Feb. 1, 1938 |
| 2,108,256 | Dym | Feb. 15, 1938 |
| 2,131,809 | Killen | Oct. 4, 1938 |
| 2,489,932 | Rosenblum | Nov. 29, 1949 |
| 2,508,793 | Miller | May 23, 1950 |
| 2,571,893 | Kendall | Oct. 16, 1951 |